(12) United States Patent
Dupuis et al.

(10) Patent No.: US 8,186,121 B2
(45) Date of Patent: May 29, 2012

(54) SUPPORT DEVICE FOR ELEMENTS ON A PIECE OF SPACE EQUIPMENT WITH FLEXIBLE DEPLOYING ARMS

(75) Inventors: Jean Dupuis, Auribeau sur Siagne (FR); Frédéric Falzon, Pegomas (FR); Laurent Blanchard, Mouans-Sartoux (FR)

(73) Assignee: Thales (FR)

( * ) Notice: Subject to any disclaimer, the term of this patent is extended or adjusted under 35 U.S.C. 154(b) by 804 days.

(21) Appl. No.: 11/722,961

(22) PCT Filed: Dec. 22, 2005

(86) PCT No.: PCT/FR2005/051122
§ 371 (c)(1),
(2), (4) Date: Apr. 11, 2008

(87) PCT Pub. No.: WO2006/070156
PCT Pub. Date: Jul. 6, 2006

(65) Prior Publication Data
US 2008/0290221 A1  Nov. 27, 2008

(30) Foreign Application Priority Data
Dec. 28, 2004  (EP) ..................... 04293150

(51) Int. Cl.
*E04H 12/00* (2006.01)
*E04H 12/18* (2006.01)
*E04B 1/32* (2006.01)
*E04B 7/08* (2006.01)
*E04C 3/38* (2006.01)

(52) U.S. Cl. ............. 52/655.1; 52/111; 52/108; 52/109; 52/648.1; 52/646; 52/639; 52/640; 52/641; 52/644; 52/645

(58) Field of Classification Search ................ 52/655.1, 52/648.1, 646, 639, 640, 641, 644, 645, 108, 52/109, 111
See application file for complete search history.

(56) References Cited

U.S. PATENT DOCUMENTS

| | | | |
|---|---|---|---|
| 3,474,488 A | | 10/1969 | Kruzich |
| 4,334,391 A | * | 6/1982 | Hedgepeth et al. ............ 52/108 |
| 4,480,415 A | * | 11/1984 | Truss ............................. 52/108 |
| 4,532,742 A | * | 8/1985 | Miura ............................ 52/108 |
| 4,662,130 A | * | 5/1987 | Miura et al. ................... 52/108 |
| 4,866,892 A | * | 9/1989 | Satoh et al. .................... 52/108 |
| 4,918,884 A | * | 4/1990 | Okazaki et al. ................ 52/108 |
| 4,969,301 A | * | 11/1990 | Warden ......................... 52/108 |
| 5,003,736 A | | 4/1991 | Okazaki et al. |
| 5,085,018 A | * | 2/1992 | Kitamura et al. ............. 52/108 |

(Continued)

FOREIGN PATENT DOCUMENTS
EP           0509291            10/1992

*Primary Examiner* — Mark Wendell
(74) *Attorney, Agent, or Firm* — Lowe Hauptman Ham & Berner, LLP

(57) ABSTRACT

A device supporting a first and a second element of a piece of space equipment. The device includes at least two deployable flexible arms each having a first end and a second end, the ends are secured respectively to the first and second elements and each designed to adopt at least one initial position folded in curves and an unfolded final position, in which positions they hold the first element away from the second element by first and second chosen distances respectively, the second distance being greater than the first.

25 Claims, 5 Drawing Sheets

U.S. PATENT DOCUMENTS

Figure 1A:
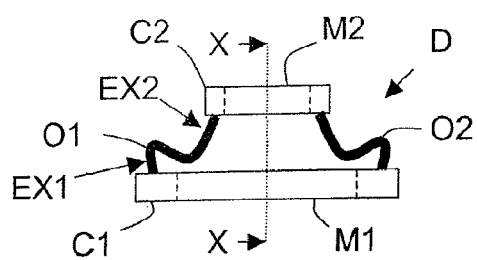

| | | | |
|---|---|---|---|
| 5,163,262 A * | 11/1992 | Adams | 52/646 |
| 5,857,648 A * | 1/1999 | Dailey et al. | 244/172.6 |
| 6,904,722 B2 * | 6/2005 | Brown et al. | 52/121 |
| 6,920,722 B2 * | 7/2005 | Brown et al. | 52/108 |
| 7,743,576 B2 * | 6/2010 | Johnson | 52/646 |
| 7,782,530 B1 * | 8/2010 | Krumel et al. | 359/399 |
| 7,856,735 B2 * | 12/2010 | Allezy et al. | 33/771 |
| 2005/0183377 A1 * | 8/2005 | Johnson | 52/646 |

* cited by examiner

SUPPORT DEVICE FOR ELEMENTS ON A PIECE OF SPACE EQUIPMENT WITH FLEXIBLE DEPLOYING ARMS

CROSS-REFERENCE TO RELATED APPLICATIONS

The present Application is based on International Application No. PCT/FR2005/051122, filed on Dec. 22, 2005, which in turn corresponds to European Application No. 04293150.1 filed on Dec. 28, 2004, and priority is hereby claimed under 35 USC §119 based on these applications. Each of these applications are hereby incorporated by reference in their entirety into the present application.

FIELD OF THE INVENTION

The invention relates to pieces of equipment carried onboard satellites and, more particularly, to the devices that support certain elements of these pieces of equipment.

BACKGROUND OF THE INVENTION

Here, the expression "piece of equipment carried onboard" is to be understood as meaning any piece of equipment at least partially secured to at least one satellite. It may in particular be an observation instrument intended to carry out a space observation mission and consisting for example of one or more space telescopes, possibly spread over several satellites, or at least one radar antenna, or alternatively a plasma jet, or even a sensor.

Also, the expression "space observation mission" must be understood here to mean both missions intended to observe the Earth from space and missions intended to observe part of the universe from space.

In order to carry out observation missions, certain satellites comprise at least part of an observation instrument, for example such as a space telescope, for example of the Cassegrain, Gregory, Korsch, Ritchey-Chrétien or Newton type.

Such telescopes comprise at least one support device intended to keep a first element, such as a mirror (possibly of the primary type (often known as a collector)) a chosen distance away from a second element, such as a mirror (possibly of the secondary type) or part of a detector, installed at the focal plane where the images are formed. Such a device, together with the elements that it supports, constitutes a structure of set geometric configuration. This structure is sized in such a way that it can withstand the mechanical stresses due to gravity and the loads (or forces) experienced during the various phases of the launch, especially as the rocket in which the satellite fitted with the device is carried lifts off.

Once the mission has begun, the loads that the structure has to withstand are very low, if not practically zero. The structure therefore proves to be over-engineered throughout its operational life, leading to an inertia, particularly a transverse inertia, that is higher than is truly necessary. Since this "over-inertia" cannot be reduced in orbit, it limits the rate of change of aim point of the telescope and therefore the time during which it can acquire images, something which is penalizing particularly when it is carried onboard a so-called "agile" satellite and/or when a "mosaic image" needs to be compiled (because the field of the instrument is smaller than the field that needs to be observed).

Furthermore, the over-engineering of the support structure results in additional mass and additional bulk which mean that higher capacity rockets need to be used to carry it and/or which may limit the number of satellites that can be launched from the same rocket.

SUMMARY OF THE INVENTION

It is therefore an object of the invention to improve this situation.

To this end, the invention proposes a device for supporting a first and a second element of a piece of space equipment (such as an observation instrument for example), which is intended to be carried onboard at least one satellite, comprising at least two flexible arms that can be deployed (or more simply, "deployable" arms) each comprising a first end and a second end which ends are secured respectively to the first and second elements and each designed to adopt at least one initial position (folded in curves) and one (unfolded) final position, in which positions they hold the first element away from the second element by first and second chosen distances respectively, the second distance being greater than the first.

The support device according to the invention may have other features which can be taken separately or in combination, and, in particular:

- at least three flexible arms each comprising a first end and a second end which are secured respectively to the first and second elements at different positions which are chosen and laid out in such a way as to adopt respective initial final positions in which they hold the first element away from the second element by the first and second chosen distances respectively;
- three pairs of arms in each of which the two arms may constitute two nonparallel sides of a trapezium once they have been positioned in their respective final positions; the arms of each pair may have identical lengths so the corresponding trapezium (Ti) is of the isosceles type;
- as an alternative, three pairs of arms in each of which the two arms may constitute two sides of a triangle once they have been positioned in their respective final positions; the arms of each pair may have identical lengths so the corresponding triangle is of the isosceles type;
- a first frame to which the first element and the first end of each arm may be fixed so as to be secured to the first element, and a second frame to which the second element and the second end of each arm may be fixed so as to be secured to the second element;
- the first and second ends of each arm may be respectively fixed to the first and second frames by a mechanical connection and/or an immobilizing material intended to block any degree of freedom of movement;
- each arm may comprise a first sub-arm comprising the first end and a third end and a second sub-arm comprising the second end and a fourth end. In this case, a third frame may be provided, inserted between the first and second frames and to which the third end of each first sub-arm and the fourth end of each second sub-arm are fixed;
  - the third and fourth ends of each first sub-arm and each second sub-arm may be fixed to the third frame by a mechanical connection and/or an immobilizing material intended to block any degree of freedom of movement;
- damping means may be tasked with damping the movement of the second element as each arm reaches its final position;
- guide means may be tasked with guiding at least some of the movement of the second element as each arm moves from its initial (folded or coiled or furled) position towards its final (unfolded or uncoiled or unfurled) position, or in other terms, with confining the dynamics of the deployment;

movement means may be tasked with moving the first end and/or the second end of at least one of the arms so as to control its final position and the position of the first element with respect to the second element;

retractable immobilizing means may be tasked with immobilizing the first element and/or the second element with respect to a rigid structure of the piece of equipment while each arm is still in its initial position;

each flexible arm may be arranged in such a way as to tolerate at least two bends in at least one chosen plane while it is in the initial position;

each flexible arm is, for example, capable of tolerating at least two bends in one and the same plane while it is in its initial position;

as an alternative, each flexible arm is, for example, capable of tolerating at least two bends in at least two different planes while it is in its initial position;

each flexible arm may be made of carbon fiber;

the first element is, for example, a mirror, possibly of the primary type;

the second element is, for example, a secondary mirror or part of a detector, installed in a focal plane.

The invention also proposes a piece of space equipment, of the observation instrument type, comprising at least one assembly of a first and a second element which is supported by at least one support device of the type explained hereinabove.

Figure 1B:
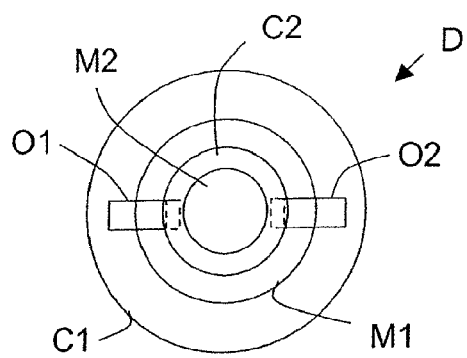
Figure 2:
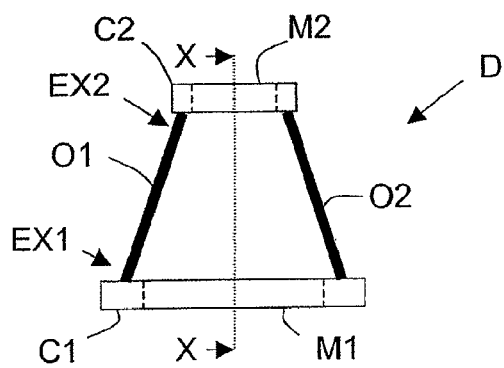
Figure 3:
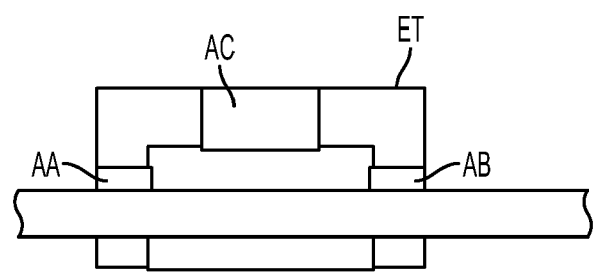
Figure 4:
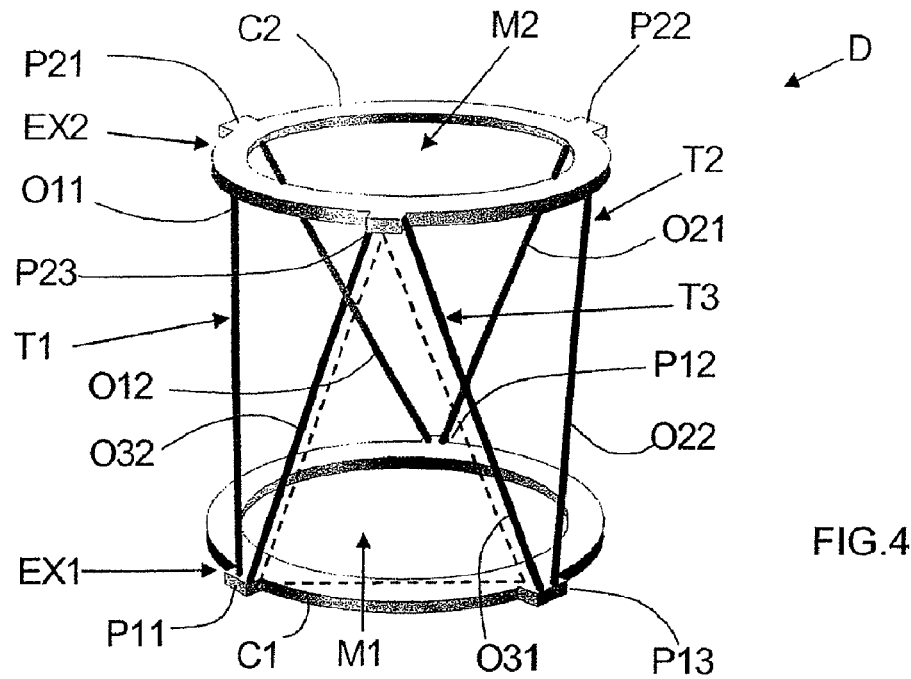
Figure 5:
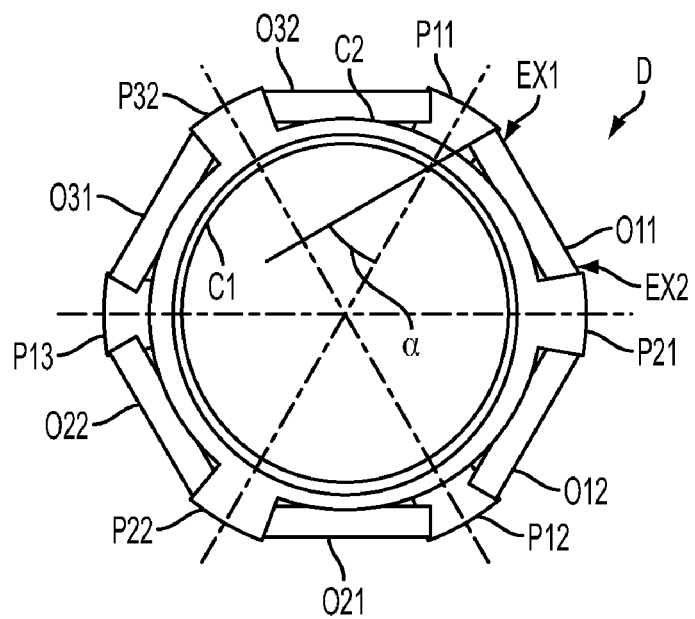
Figure 6:
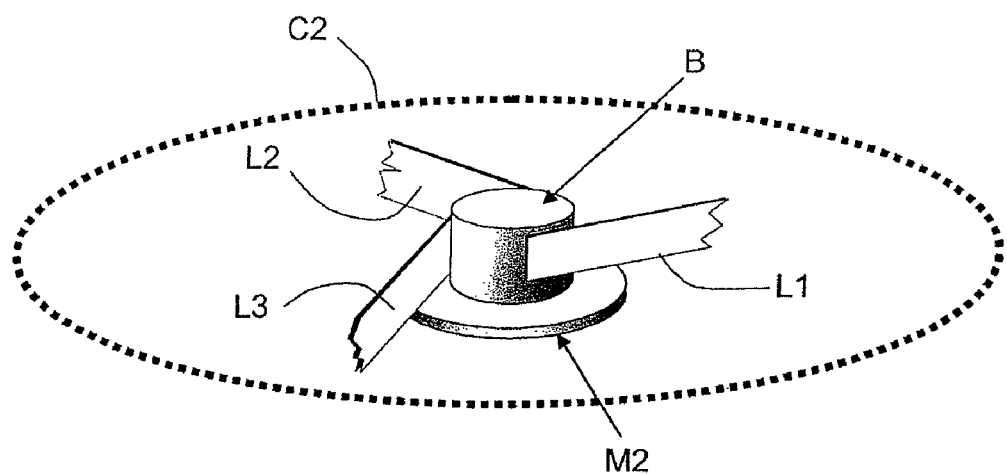
Figure 7:
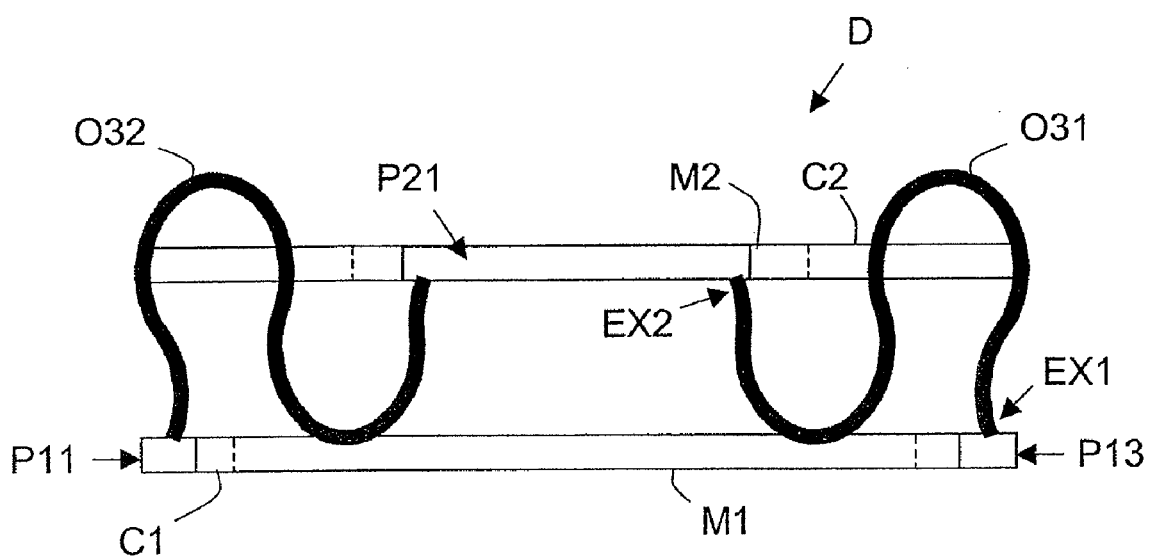
Figure 8:
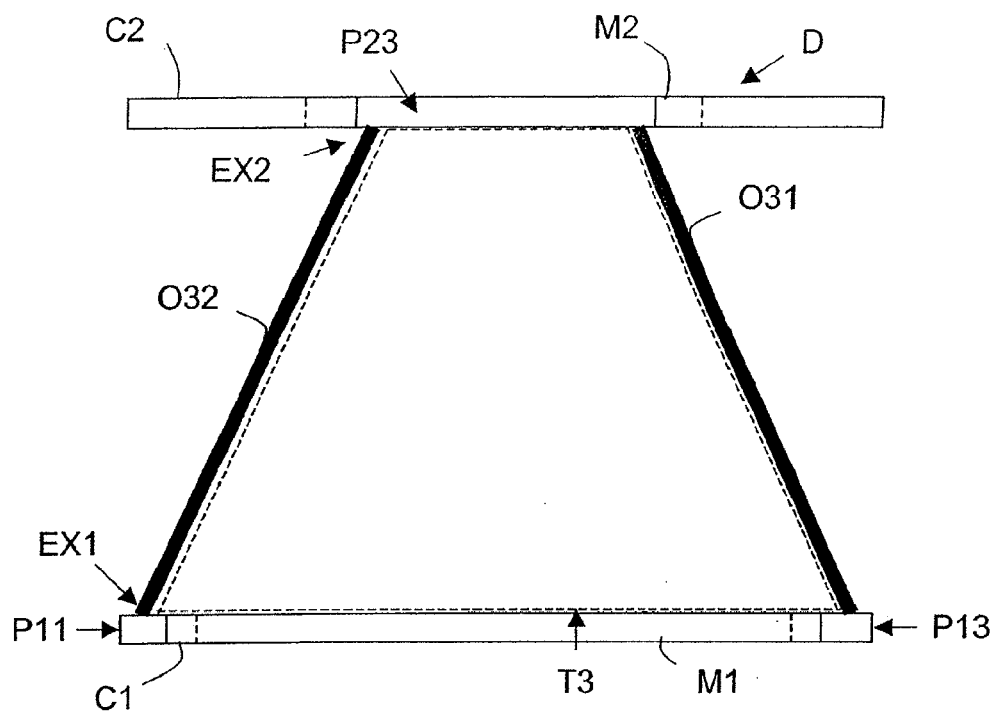
Figure 9:
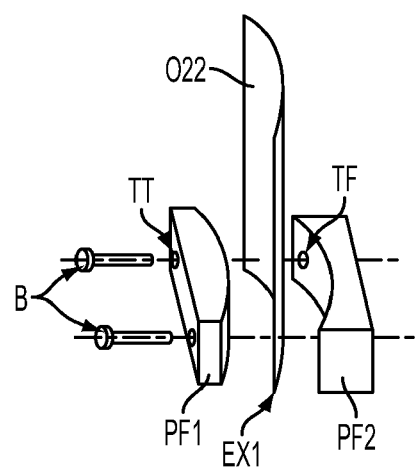
Figure 10:
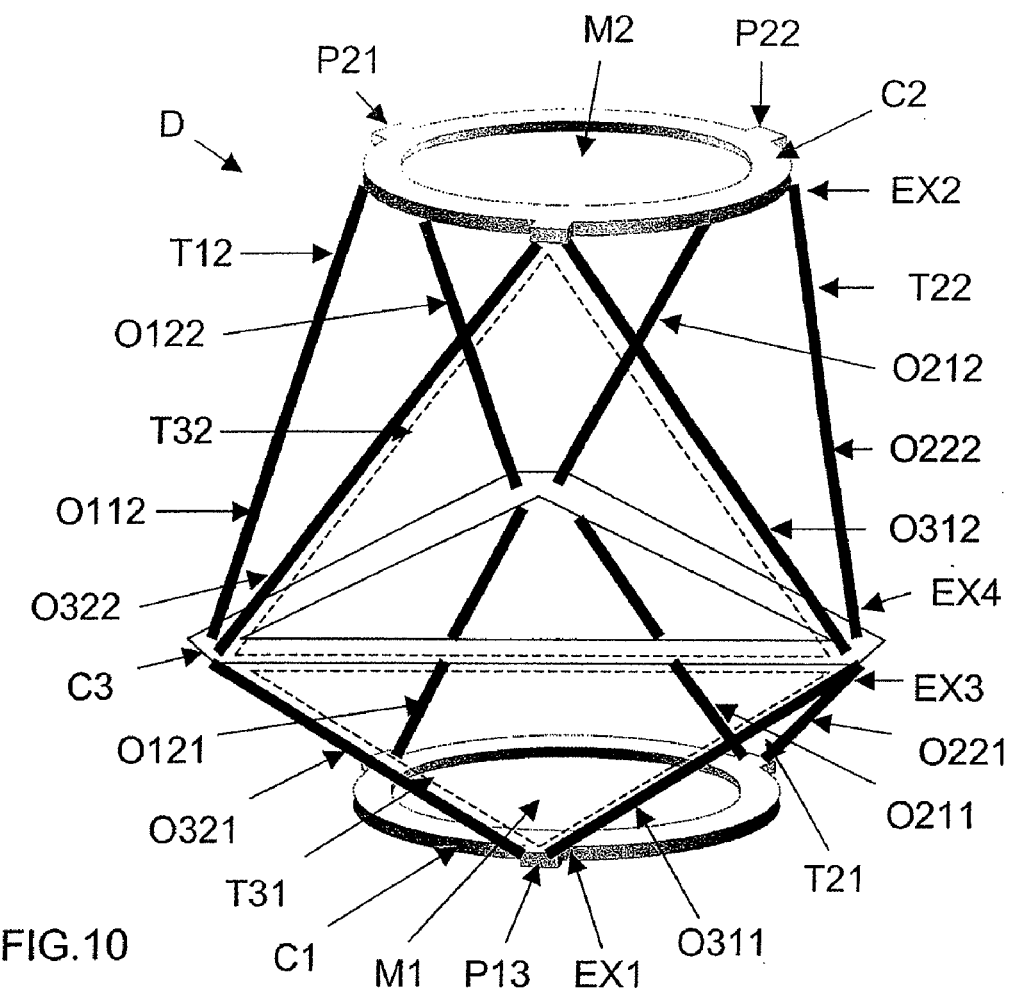
Figure 11:
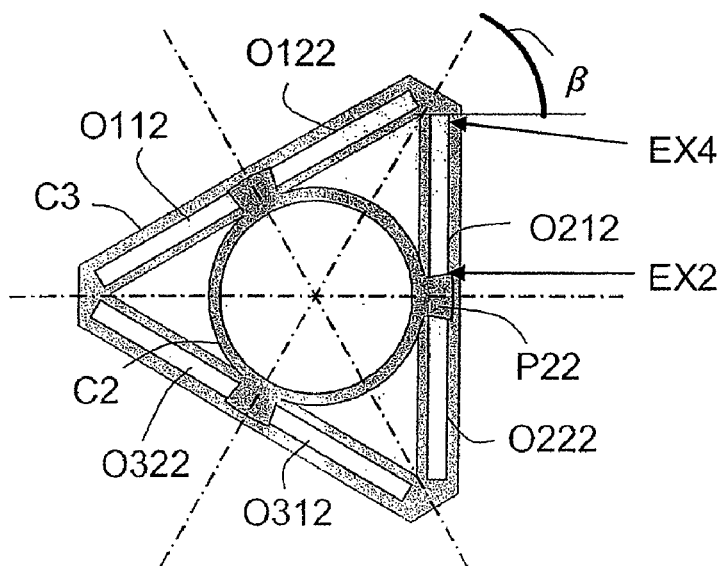

Other features and advantages of the invention will become apparent upon examining the detailed description which follows, and the attached drawings, in which:

FIGS. 1A and 1B very schematically illustrate, in a (diametral) cross-sectional view and in a view from above, respectively, a first embodiment of a device for supporting elements of a telescope, according to the invention, in its initial position (with the arms folded in curves), FIG. 2 very schematically illustrates, in a side view, the first exemplary embodiment of the support device of FIGS. 1A and 1B, when it is positioned in its (unfolded) final position, FIG. 3 very diagrammatically illustrates, in a side view, one exemplary embodiment of a movement means of the "reptation" (or "linchworm") type, FIG. 4 very diagrammatically illustrates, in a perspective view, a second exemplary embodiment of a device for supporting elements of a telescope, according to the invention, positioned in its (unfolded) final position, FIG. 5 very schematically illustrates, in a slightly deformed view from above, the second exemplary embodiment of the support device of FIG. 4, when positioned in its (unfolded) final position, FIG. 6 very schematically and partially illustrates, in a perspective view, one example of a method of fixing a second mirror to a second frame, FIG. 7 very schematically illustrates, in a side view, the second exemplary embodiment of the support device of FIG. 4, when in its initial position (with the arms folded in curves), FIG. 8 very schematically illustrates, in a side view, the second exemplary embodiment of the support device of FIG. 4, when positioned in its (unfolded) final position, FIG. 9 very schematically illustrates, in a perspective view, one example of a method of fixing the deployable flexible arms of a support device according to the invention, FIG. 10 schematically illustrates, in a perspective view, a third exemplary embodiment of a device for supporting elements of a telescope, according to the invention, positioned in its (unfolded) final position, and FIG. 11 very schematically illustrates, in a view from above, the third exemplary embodiment of the support device of FIG. 10, when positioned in its (unfolded) final position.

DETAILED DESCRIPTION OF THE PREFERRED EMBODIMENTS

The attached drawings can be used not only to supplement the invention, but also to contribute to defining it, as necessary.

It is an object of the invention to allow a reduction in the mass and inertia, particularly transverse inertia, of a piece of space equipment carried onboard at least one satellite intended to be put into orbit using a rocket (or a launcher).

To these ends, the invention proposes a support device (D) intended to support at least two elements of a piece of space equipment which are carried onboard the same satellite.

In that which follows it will be considered that the piece of space equipment is an observation instrument such as a telescope carried onboard an observation satellite, for example of the agile type.

However, the invention is not restricted to this type of space equipment. Indeed, the equipment may be an observation instrument made up of several telescopes distributed over several satellites flying in formation, or alternatively may be a radar antenna comprising a first element such as a reflector and a second element such as a source. It could also be so-called plasma jets designed to control the attitude of the satellite and which need to be deployed once the satellite is in orbit, so as to increase the lever arm in order to reduce the magnitude of the forces that need to be applied. It could equally be sensors of which a part, intended for data acquisition, needs to be spaced away from the satellite once the satellite has been put into its orbit, so as not to cause electromagnetic or simply electrical disturbances.

The support device (D) according to the invention forms part of the piece of equipment, in this instance a telescope, of which it supports at least two elements and is generally secured to the structure of the satellite. When the observation instrument is made up of several telescopes carried onboard several satellites, it comprises several assemblies of first and second elements, each one supported by a support device D installed on one of the satellites.

In that which follows, it will be considered by way of nonlimiting example that the telescope is of the Cassegrain type and that the two elements supported by the support device (D) according to the invention are a "primary" mirror and a "secondary" mirror.

However, the invention is not restricted to this type of space telescope. Indeed, it relates to all telescopes (or observation instruments) in which two elements involved in the observation (or data acquisition) need to be held apart by a chosen distance. These two elements may therefore be two mirrors (one being of the primary type and the other of the secondary type), as for example in the case of telescopes of the Gregory, Korsch or Ritchey-Chrétien type, or a mirror and part of a detector, installed at the focal plane where the images are formed, as for example in the case of a Newton telescope or alternatively, a flat reflecting mirror and another mirror.

Reference is first of all made to FIGS. 1 and 2 in order to describe a first exemplary embodiment of a support device D according to the invention.

The support device D comprises at least two deployable flexible arms O1 and O2 each comprising a first end EX1 and a second end EX2 which ends are secured respectively to the primary mirror M1 and to the secondary mirror M2 of the telescope (or to that part of a detector that lies in the focal plane).

In the example illustrated in FIGS. 1 and 2, the support device D has just two deployable flexible arms O1 and O2. However, as will be seen later on, it may have several of these, for example three or four or even more.

It is important to note that the ends EX1 and EX2 of each arm O1, O2 can be secured to the primary M1 and secondary M2 mirrors either directly or indirectly. In the example illustrated in FIGS. 1 and 2, they are secured indirectly. More specifically, the support device D comprises, on the one hand, a first rigid frame C1 to which the primary mirror M1 and the first end EX1 of each flexible arm O1, O2 are fixed, and, on the other hand, a second rigid frame C2 to which the secondary mirror M2 and the second end EX2 of each flexible arm O1, O2 are fixed.

In the exemplary embodiment illustrated schematically in FIGS. 1 and 2, the second frame C2 has a smaller diameter than the first frame C1. However, as will be seen later on with reference to FIGS. 4 to 9, the first C1 and second C2 frames may have substantially identical diameters.

Any fixing means may be conceived of for securing the first end EX1 and second end EX2 of each arm O1, O2 (in this instance) to the first C1 and second C2 frames. This fixing may, for example, be done using a mechanical connection intended to block any degree of freedom of movement. As an alternative or as a supplement, each end EX1, EX2 may be embedded (or "potted") in an immobilizing material, such as a curable resin for example, so as to block any degree of freedom of movement.

The arms O1, O2 are arranged in such a way as to adopt at least some initial positions folded in curves in which positions they hold the primary mirror M1 away from the secondary mirror M2 by a first chosen distance, and unfolded final positions in which they hold the primary mirror M1 away from the secondary mirror M2 by a second chosen distance greater than the first.

It is important to note that the folds (or bends) of one flexible arm O1, O2 may all lie substantially in the same plane, or alternatively may lie in at least two different planes (because of its flexibility). Furthermore, the folds (or bends) of the various flexible arms O1 and O2 are not necessarily all the same as each other.

It is, for example, possible to use curved flexible arms, of the type partially illustrated in FIG. 6. Each flexible arm O1, O2 may be arranged in the form of a metal tape measure. However, in order to exhibit the required thermal stability, each arm O1, O2 is preferably made of carbon fiber.

Each flexible arm may also consist of two arms of the tape measure type, attached by their longitudinal edges and positioned so that the cavities defined by their curled-up edges lie face to face once they have been positioned in the final position. When they are in the folded position, the two arms are pressed against one another and have no curled-up edges.

As has been illustrated schematically in FIG. 1A, each flexible arm O1, O2 is able to tolerate at least two bends in at least one chosen plane while it is in its initial position. The number of bends that a flexible arm has to tolerate in fact depends on the space available for folding and/or on the length that it must exhibit when unfolded, that is to say when it is positioned in its final position illustrated in FIG. 2 and/or on its elastic limit which is associated with a minimum radius of curvature below which it may suffer permanent deformation (cleavage).

As illustrated in FIG. 1A, when the arms O1 and O2 are in their folded initial position, the primary M1 and secondary M2 mirrors are close together, so as to make what those skilled in the art commonly call the "tube" of the telescope compact (or so as to reduce the initial longitudinal length of this part) along its axis of revolution XX while the satellite onboard which it is carried has not yet reached its mission orbit.

By virtue of this compactness (or short length) and the lighter weight structure offered by the support device D, it is possible to use a smaller capacity rocket to carry it and/or to increase the number of satellites that a rocket (or launcher) can put into orbit.

Since the support structure has been lightened in weight, it is preferable to provide immobilizing means intended to immobilize the secondary mirror (second element) M2 (or, more specifically, the second frame C2 to which it is fixed) together possibly with each deployable flexible arm O1, O2 with respect to the main structure of the telescope (to which is fixed the primary mirror (first element) M1 (or more specifically the first frame C1 to which it is fixed)) during the launch phase. Any retractable immobilizing means known to those skilled in the art can be used for this purpose.

As illustrated in FIG. 2, when the arms O1 and O2 have been positioned in their unfolded final position, the primary M1 and secondary M2 mirrors are held apart by the second chosen distance, which is the distance at which the telescope works best. The length of the telescope tube is therefore appreciably longer than when the arms O1 and O2 are in their folded initial position. However, since the support structure is lighter in weight, the inertia of the telescope is lower, which means that the rate at which its aim point can be changed is increased, thus making it possible to increase the time during which it can acquire images.

Since the first EX1 and second EX2 ends of each arm O1 and O2 are fixed to parts of the first C1 and second C2 frames which parts lie at the periphery of the primary M1 and secondary M2 mirrors, there is no arm O1, O2 in the path of the photons collected by the telescope. In other words, the deployable flexible arm or arms do not obstruct the field of view of the telescope.

The flexible arms Oij are preferably held in their initial position (under elastic stress) during the launch phase using retractable immobilizing means (not depicted). It is also preferable to provide retractable immobilizing means intended to immobilize the secondary mirror (second element) M2 (or more specifically the second frame C2 to which it is fixed) with respect to the main structure of the telescope (to which the primary mirror (first element) M1 is fixed (or more specifically the first frame C1 to which it is fixed)) during the launch phase. Any retractable immobilizing means known to those skilled in the art can be used for this purpose.

Furthermore, because of the shock experienced by the secondary mirror M2 when the flexible arms O1 and O2 having been released reach their final position, it is preferable to provide means tasked with damping the movement of said secondary mirror M2. Any damping means known to those skilled in the art can be used for this purpose, particularly the kind of means used for damping deployable solar panels.

Furthermore, in order to prevent the simultaneous unfolding of the various arms O1 and O2 from causing the secondary mirror M2 to be positioned incorrectly, guide means may be provided. These means are then tasked with guiding at least some of the movement of the secondary mirror M2 (second element) as the arms O1 and O2 pass from their folded initial position towards their unfolded final position. Any guide means known to those skilled in the art can be used for this purpose, particularly cables or lines connecting the first C1 and second C2 frames (for example).

In addition, in order to allow very small disorientations of the secondary mirror (second element) M2 with respect to the primary mirror (first element) M1, the support device may comprise movement means. These are more specifically tasked with moving the first end E1 and/or the second end E2 of at least one of the flexible arms O1 and O2 with respect to the frame C1 or C2 to which it is secured so as to control its final position and therefore the position of the secondary mirror M2 with respect to the primary mirror M1.

Any movement means known to those skilled in the art may be used for this purpose, particularly piezoelectric components that allow a so-called "caterpillar" movement, such as actuators of the "reptation" (or "inchworm") type.

Inchworms (or stepping actuators of the reputation type) allow relatively large movements to be achieved at very fine resolution. They can be used to deploy micrometric structures, such as space telescope structures that are deployed in orbit, for which large initial travels (typically of the order of 3 meters and upwards) are needed alongside very small-amplitude adjustments (typically of just a few microns) throughout the life of the observation instrument.

FIG. 3 schematically depicts an example of a yoke ET that can move step by step along a guide tube thanks to three piezoelectric actuators AA, AB and AC operating in two possible sequences: forward or reverse. The actuators AA and AB are electric grippers allowing one or other of the yoke legs to be blocked along the guide tube. The body of the yoke can be lengthened using the actuator AC, thus causing the free leg to slide along the tube. The tube may be replaced by a flexible arm and the yoke may be connected to one of the frames which in this instance form the tube of the telescope.

Reference is now made to FIGS. 4 to 9 to describe a second exemplary embodiment of a support device D according to the invention.

In this second exemplary embodiment, the support device D comprises six deployable flexible arms Oij, collaborating in pairs. Here, the suffix i ranges between 1 and 3 and is used to denote a pair of arms, and the suffix j ranges between 1 and 2 and differentiates between the two arms of the same pair. Thus, the first pair (i=1) comprises the arms O11 and O12, the second pair (i=2) comprises the arms O21 and O22, and the third pair (i=3) comprises the arms O31 and O32.

As in the first exemplary embodiment, any fixing means may be conceived of for securing the first EX1 and second EX2 ends of each arm Oij (in this instance) to the first C1 and second C2 frames.

The six flexible arms are offset slightly towards the outside of the tube by fixing lugs Pkn so as not to obstruct the working optical stream (here defined by the inside diameter of the frames C1 and C2).

Here, unlike in the first exemplary embodiment, the first C1 and second C2 frames have substantially identical diameters. However, that is not compulsory. The second mirror M2, which is smaller than the first mirror M1, is then preferably attached to the second frame C2 by three rigid arms positioned tangentially 120° apart, for example. Such a method of attachment is partially and schematically illustrated in FIG. 6.

In this method of fixing, a casing B containing a mirror fixing device (DFM), not depicted, to which the second mirror M2 is bonded is provided. The mirror fixing device (interposed between the casing B and the second mirror M2) has the role of filtering out the stresses due to the fixing screws (tightening) which could deform the second mirror M2.

The casing B is fixed to the second frame C2 by means of a device, generally termed a spider and made up of three rigid arms L1 to L3 tangential to the lateral surface of said casing B. Expansion of the arms (due, for example, to imprecise knowledge of the precise operating temperature of the telescope in orbit) causes the casing B to rotate, not altering the adjustment of the observation instrument and not introducing stresses into the second mirror M2.

The first EX1 and second EX2 ends may for example be secured using a mechanical connection intended to block any degree of freedom of movement. One example of a mechanical connection is illustrated in FIG. 9. Here, each end EX1 or EX2 of an arm Oij (for example O22) is set between two immobilizing pieces PF1 and PF2.

The piece PF2 is, for example, secured to (or forms an integral part of) a fixing lug Pkn of one of the first C1 and second C2 frames and comprises two threaded holes TF. Here, the suffix k ranges between 1 and 3 and is used to denote one of the three fixing lugs of the first C1 or second C2 frames, and the suffix n ranges between 1 and 2 and denotes either the first C1 or the second C2 frame. Thus, the fixing lugs P11, P12 and P13 belong to the first frame C1, while the fixing lugs P21, P22 and P23 belong to the second frame C2.

The piece PF1 has, for example, a portion the shape (in this instance convex) of which complements that (in this instance concave) of a portion of the piece PF1 and has two through holes TT for the passage of bolts B. The piece PF2 is attached or secured to (or forms an integral part of) a fixing lug Pkn of one of the first C1 and second C2 frames.

Each end EX1 and EX2 also comprises two through holes for the passage of bolts B and therefore for immobilizing it with respect to the pieces PF1 and PF2.

Of course, it is possible to dispense with the fixing lugs Pkn which in this instance project from the periphery of the first C1 and second C2 frames.

As an alternative or as a supplement, each end EX1, EX2 may be embedded (or potted) in an immobilizing material, such as a curable resin for example, so as to block any degree of freedom of movement.

As is diagrammatically illustrated in FIG. 7, each flexible arm Oij (only O32 and O31 are depicted) in this instance is able to tolerate four bends in at least one chosen plane while it is in its folded initial position. The number of bends that a flexible arm has to be able to tolerate also depends on the space available for folding and/or on the length that the arm has to have when unfolded, that is to say when the arm is positioned in its final position illustrated in FIG. 8.

It is important to note that the folds (or bends) of a flexible arm Oij may all lie substantially in one and the same plane, or alternatively may lie in at least two different planes (because of its flexibility). Furthermore, the folds (or bends) of the various flexible arms Oij are not necessarily all the same as each other.

The mean plane of each flexible arm may be directed optimally for allowing the flexible arms to be folded in six planes perpendicular to the plane of the first frame C1 and to make it easier to guide them during deployment. Each of these six planes is specific to one arm and defined by the three points EX1, EX2 with the arm in the folded position and EX2 with the arm in the unfolded position. The mean plane of the flexible arm has therefore to be perpendicular to this plane. Specifically, in this case, the folded arms are not laterally stressed, thus improving their stability in the folded position.

FIG. 5 schematically illustrates the optimum orientation of the flexible arms in a view of the telescope tube from above. The inside diameter of the frame C1 has been reduced slightly here for ease of understanding. The line of the first end EX1 of the flexible arm o11 on the fixing lug P11 here makes an angle of about 30° with the nearest axis of symmetry. The same is true of all the flexible arm ends.

Furthermore, as in the first example, it is preferable to provide means tasked with damping the movement of the secondary mirror M2 (second element) and/or means tasked with guiding the secondary mirror M2 and/or retractable means tasked with immobilizing the second C2 and third C3 frames, together possibly also with the arms Oij. It is also possible to provide means tasked with moving at least one of the first EX1 and/or second EX2 ends of the arms Oij.

As mentioned previously, in this second exemplary embodiment, the flexible arms Oij preferably collaborate in pairs. More specifically, the support device D comprises at least three pairs of flexible arms Oij, in each of which pairs the two arms (Oi1 and Oi2) constitute two nonparallel sides of a three-sided polyhedron (triangle) or four-sided polyhedron (trapezium) whilst they have been positioned in their respective final positions. These three pairs of flexible arms Oij define a hexapod once they have been positioned in their respective final positions (see FIG. 4). This hexapod is folded substantially along the main axis of symmetry XX when the three pairs of flexible arms Oij are in their respective initial positions.

In the example illustrated in FIG. 4, two flexible arms Oi1 and Oi2 of each of the three pairs constitute two nonparallel sides of a trapezium Ti (T1 to T3), embodied in dotted line in the case of T3, once they have been positioned in their respective final positions.

Because of this particular layout, the two flexible arms Oij of a pair create forces the vector components of which contribute to establish an equilibrium in the plane of the figure. Overall equilibrium is therefore afforded by the collaboration of the three pairs of arms, the second ends E2 of which are carefully distributed at the periphery of the second frame C2. More specifically, the second ends E2 here are secured to the fixing lugs Pkn which are positioned substantially 120° apart.

This equilibrium is optimized when the flexible arms Oij of the various pairs have identical lengths, and the corresponding trapeziums Ti are therefore of the isosceles type.

It is clear that the shorter the distance separating the second ends E2 of the two flexible arms Oij of a pair, the more the polyhedron that the arms form tends towards the shape of a triangle. As in the case of the trapeziums, equilibrium of the structure is optimized when the flexible arms Oij of the various pairs are of the same length, and the corresponding triangles Ti are therefore of the isosceles type.

Reference is now made to FIGS. 10 and 11 to describe a third exemplary embodiment of a support device D according to the invention.

In this third exemplary embodiment, each deployable flexible arm Oij is subdivided into a first Oij1 and a second Oij2 sub-arm.

Each first sub-arm Oij1 comprises the first end EX1 and a third end EX3 and each second sub-arm Oij2 comprises the second end EX2 and a fourth end EX4.

For example, each second sub-arm Oij2 is flexible, while each first sub-arm Oij1 may be either flexible or rigid.

Each third end EX3 of a first sub-arm Oij1 is secured indirectly to the fourth end EX4 of the second sub-arm with which it constitutes an arm Oij, by means of a rigid third frame C3 inserted between the first C1 and second C2 frames. More specifically, the third end EX3 of each first sub-arm Oij1 is secured to a first side of the third frame C3, while the fourth end EX4 of each second sub-arm Oij2 is secured to a second side of the third frame C3, for example opposite the first side, and substantially at the same location as the corresponding third end EX3.

As in the first and second exemplary embodiments, any means of fixing may be conceived of for securing the third EX3 and fourth EX4 ends of the sub-arms Oij1 and Oij2 to the third frame C3.

Securing may, for example, be performed using a mechanical connection intended to block any degree of freedom of movement and, for example, by in-building as illustrated in FIG. 9. As an alternative or as a supplement, each end EX3, EX4 may be embedded (or potted) in an immobilizing material, such as a curable resin for example, so as to block any degree of freedom of movement.

In the example illustrated in FIGS. 10 and 11, the third frame C3 is arranged in the form of an equilateral triangle. Although this is not visible in FIG. 10, the frame is hollow in the middle. However, other forms of frame may be imagined.

In this third example, as in the second example set out hereinabove with reference to FIGS. 4 to 9, the first sub-arms Oij1 collaborate in pairs, as do the second sub-arms Oij2.

Each sub-arm Oij1, Oij2 is of the same kind as those explained hereinabove in the first and second exemplary embodiments. The way in which the first sub-arms Oij1 are folded in their initial position folded in curves, and likewise the way in which the second sub-arms Oij2 are folded, is therefore the same as was described hereinabove, each sub-arm having to tolerate at least two bends in at least one plane.

In the example illustrated in FIG. 10, the support device D comprises three pairs of (flexible or rigid) first sub-arms Oij1, in each of which pairs the two sub-arms (Oi11 and Oi21) constitute two nonparallel sides of a three-sided polyhedron (triangle) or four-sided polyhedron (trapezium) once they have been positioned in their respective final positions.

When they are flexible, these three pairs of first sub-arms Oij1 ((O111, O121), (O211, O221), (O311, O321)) define a first hexapod once they have been positioned in their respective final positions. Otherwise, they constitute a first hexapod from the outset.

This first hexapod is, in the event of flexibility, folded substantially along the main axis of symmetry XX when the three pairs of first flexible sub-arms Oij1 are in their respective initial positions.

Furthermore, the support device D also comprises three pairs of flexible second sub-arms Oij2, in each of which pairs the two sub-arms (Oi12 and Oi22) constitute two nonparallel sides of a three-sided polyhedron (triangle) or four-sided polyhedron (trapezium) once they have been positioned in their respective final positions. These three pairs of flexible second sub-arms Oij2 ((O112, O122), (O212, O222), (O312, O322)) define a second hexapod once they have been positioned in their respective final positions. This second hexapod is also folded substantially along the main axis of symmetry XX when the three pairs of flexible second sub-arms Oij2 are in their respective initial positions.

The support structure is therefore somewhat formed of two hexapods mounted top to tail.

In the example illustrated in FIG. 10, two first sub-arms Oi11 and Oi21 of each of the three pairs of the first hexapod constitute two nonparallel sides of a trapezium Ti1 (T11 to T31) embodied in dotted line in the case of T31, once they have been positioned in their respective final positions. Furthermore, two flexible second sub-arms Oi12 and Oi22 of each of the three pairs of the second hexapod constitute two nonparallel sides of another trapezium Ti2 (T12 to T32), embodied in dotted line in the case of T12, once they have been positioned in their respective final positions.

It is important to note that the pairs of first sub-arms Oi11 and Oi21 may constitute parallel sides of polyhedra (triangles or trapeziums) of first dimensions, and the pairs of second sub-arms Oi12 and Oi22 may constitute parallel sides of polyhedra (triangles or trapeziums) of second dimensions, possibly different from the first dimensions (as is the case in the example illustrated). It is also conceivable for the pairs of first sub-arms Oi11 and Oi21 to constitute parallel sides of polyhedra of a first type (for example triangles) while the pairs of second sub-arms Oi12 and Oi22 constitute parallel sides of polyhedra of a second type (for example trapeziums).

The way of folding the first sub-arms Oij1 in their initial position may therefore differ from the way of folding the second sub-arms Oij2 in their initial position. In other words, the number of bends tolerated by the first sub-arms Oij1 may differ from the number tolerated by the second sub-arms Oij2. The same is true of the number of planes in which the folds (or bends) are made.

As in the second example, the trapeziums and/or the triangles formed are preferably of the isosceles type.

The configuration illustrated in FIGS. 10 and 11 is advantageous in terms of stability. It may be optimized when the third frame C3 can be inscribed inside a circle of a diameter twice that of the first C1 and second C2 frames. The line of the end EX4 of the arm O212 on the third frame C3 makes an angle β of about 60° with the nearest axis of symmetry. The line of the end EX2 of the arm O212 is substantially parallel to the closest axis of symmetry. With the flexible arms oriented in such a way, each of the three triangles can be folded in the same plane as the two flexible arms that form it. In this case, the folded arms are not laterally stressed (or almost unstressed laterally) (outside the plane of each triangle), thus improving the stability of the folded position.

Furthermore, as in the first and second examples, it is preferable to provide means tasked with damping the movement of the secondary mirror M2 (second element) and/or means tasked with guiding the secondary mirror M2 and/or retractable means tasked with immobilizing the second C2 and third C'frames, together possibly also with the first Oij1 and second Oij2 sub-arms. It is also possible to provide means tasked with moving at least one of the first EX1 and/or second EX2 and/or third EX3 and/or fourth EX4 ends of the sub-arms Oij1 and Oij2.

The invention is not restricted to the support device and space telescope embodiments described hereinabove merely by way of example but encompasses all variants that one skilled in the art may imagine within the scope of the claims which follow.

The invention claimed is:

1. A device for supporting first and second elements of a piece of space equipment, comprising:
at least two deployable flexible arms each comprising a first end and a second end in which said first and second ends are secured respectively to the first and second elements and each arm has an initial position folded in curves and one unfolded final position; in said initial and final positions said arms hold said first element away from said second element by first and second distances respectively, said second distance being greater than said first distance, wherein a first frame is fixed to said first element and said first end of each arm, and a second frame is fixed to said second element and said second end of each arm, wherein said first and second ends of each arm are respectively fixed to said first and second frames by a mechanical connection to block any degree of freedom of movement and/or an immobilizing material to block any degree of freedom of movement.

2. The device according to claim 1, comprising at least three deployable flexible arms, each arm comprising a first end and a second end which are secured respectively to said first and second elements at different positions along said first and second elements, said different positions having the at least three arms hold said first element away from said second element in said initial position and said final position by said first and second distances, respectively.

3. The device according to claim 2, comprising three pairs of arms, wherein in each pair of arms the arms constitute two nonparallel sides of a trapezium once the arms have been positioned in the respective final positions of the two arms.

4. The device according to claim 3, wherein said arms of each pair have identical lengths so the corresponding trapezium is of the isosceles type.

5. The device according to claim 2, comprising three pairs of arms wherein each of the two arms within the pairs constitute two sides of a triangle once they have been positioned in said final positions.

6. The device as according to claim 5, wherein said arms of each pair have identical lengths so the corresponding triangle is of the isosceles type.

7. The device according to claim 2 wherein said first frame to which said first element and said first end of each arm are fixed, are fixed and secured to said first element, and said second frame to which said second element and said second end of each arm are fixed, are fixed and secured to said second element wherein each arm comprises a first sub-arm comprising said first end and a third end and a second sub-arm comprising said second end and a fourth end, and in that the device comprises a third frame inserted between said first and second frames to which the third end of said first sub-arm and the fourth end of said second sub-arm are fixed.

8. The device according to claim 7, wherein said third and fourth ends of said first sub-arm and said second sub-arm are fixed to said third frame by a mechanical connection and/or an immobilizing material intended to block any degree of freedom of movement.

9. The device according to claim 2, comprising damping means configured to damp the movement of said second element as each arm reaches a final position.

10. The device according to claim 2, comprising movement means configured to move said first end or said second end of at least one of said arms so as to control said final position of said first end or said second end of said at least one said arms and the position of said second element with respect to said first element.

11. The device according to claim 2, comprising retractable immobilizing means configured to immobilize said first element or said second element with respect to a rigid structure of said piece of equipment while each arm is still in an initial position.

12. The device according to claim 2, wherein said flexible arm is capable of tolerating at least two bends in one and the same plane while it is in said initial position.

13. The device according to claim 1, comprising damping means configured to damp the movement of said second element as each arm reaches a final position.

14. The device according to claim 1, comprising guide means configured to guide at least some movement of said second element as each arm moves from said initial position towards said final position.

15. The device according to claim 1, comprising movement means configured to move said first end or said second end of at least one of said arms so as to control said final position of said first end or said second end of said at least one of said arms and the position of said second element with respect to said first element.

16. The device according to claim 1, comprising retractable immobilizing means configured to immobilize said first element or said second element with respect to a rigid structure of said piece of equipment while each arm is still in the initial position.

17. The device according to claim 1, wherein each flexible arm is made of carbon fiber.

18. The device according to claim 1, wherein said first element is a primary mirror.

19. The device according to claim 1, wherein said second element is chosen from the group consisting of at least a secondary mirror and a focal plane.

20. The device according to claim 1, wherein each flexible arm is capable of tolerating at least two bends in at least one chosen plane while it is in said initial position.

21. The device according to claim 20, wherein said flexible arm is capable of tolerating at least two bends in one and the same plane while it is in said initial position.

22. The device according to claim 20, wherein said flexible arm is capable of tolerating at least two bends in at least two different planes while it is in said initial position.

23. A piece of space equipment comprising at least one assembly of a first and a second element, wherein the first and second elements are supported by the device according to claim 1.

24. The piece of space equipment according to claim 23, wherein said piece of space equipment is arranged in the form of an observation instrument.

25. The piece of space equipment according to claim 24, wherein said observation instrument comprises at least one telescope.

* * * * *